United States Patent
Schultz

(10) Patent No.: US 7,275,903 B2
(45) Date of Patent: Oct. 2, 2007

(54) LIGHT WEIGHT FASTENER FOR USE ON INTERFERENCE FITS IN AUTOMATION

(75) Inventor: Dennis Schultz, San Juan Capistrano, CA (US)

(73) Assignee: Hi-Shear Corporation, Torrance, CA (US)

( * ) Notice: Subject to any disclaimer, the term of this patent is extended or adjusted under 35 U.S.C. 154(b) by 0 days.

(21) Appl. No.: 10/898,645

(22) Filed: Jul. 23, 2004

(65) Prior Publication Data

US 2005/0002754 A1    Jan. 6, 2005

Related U.S. Application Data

(62) Division of application No. 10/154,483, filed on May 23, 2002, now abandoned.

(51) Int. Cl.
*E01B 9/10*      (2006.01)
*F16B 23/00*     (2006.01)

(52) U.S. Cl. .................. 411/378; 411/395; 411/271; 29/525.11

(58) Field of Classification Search ........... 411/378, 411/325, 338, 339, 403, 410, 424, 428, 534, 411/914, 395, 408, 271; 29/464, 525, 525.11; 81/13
See application file for complete search history.

(56) References Cited

U.S. PATENT DOCUMENTS

| | | | |
|---|---|---|---|
| 321,691 A * | 7/1885 | Comstock ................. 411/271 |
| 3,029,912 A * | 4/1962 | Barker ..................... 403/288 |
| 3,145,750 A * | 8/1964 | Wootton ................... 411/333 |
| 3,418,012 A * | 12/1968 | La Torre ................ 403/408.1 |
| 3,494,246 A * | 2/1970 | Hensley .................... 411/362 |
| 3,763,909 A * | 10/1973 | Stover, III ................. 411/310 |
| 3,925,876 A * | 12/1975 | Curtis ........................ 29/509 |
| 3,983,304 A * | 9/1976 | Sekhon ...................... 411/504 |
| 4,006,661 A * | 2/1977 | Sims, Jr. ..................... 411/11 |
| 4,057,000 A * | 11/1977 | Thomas ..................... 411/432 |
| 4,221,152 A | 9/1980 | Jason |
| 4,228,723 A | 10/1980 | Cunningham |
| 4,403,529 A * | 9/1983 | Ikeda et al. .................. 81/56 |
| 4,472,096 A | 9/1984 | Ruhl et al. |
| 4,637,764 A * | 1/1987 | Imai .......................... 411/5 |
| 4,824,314 A * | 4/1989 | Stencel ...................... 411/378 |
| 4,836,063 A * | 6/1989 | Fushiya ....................... 81/55 |
| 4,957,401 A * | 9/1990 | Hatter ........................ 411/5 |
| 5,011,352 A * | 4/1991 | Hatter ....................... 411/271 |

(Continued)

FOREIGN PATENT DOCUMENTS

EP    0523823    1/1993

(Continued)

*Primary Examiner*—Robert J. Sandy
*Assistant Examiner*—Jeffrey A. Sharp
(74) *Attorney, Agent, or Firm*—Fulwider Patton LLP

(57) ABSTRACT

A fastener for installation into an interference fit hole within a structure. The fastener may be installed through automated installation methods. The fastener includes an enlarged protruding head at a proximal end of the fastener. Distal the head is a substantially cylindrical shoulder portion. The shoulder portion is coated with a lubricant to facilitate insertion of the shoulder portion into the interference fit hole within the structure. A threaded portion having a male thread is positioned distal to the shoulder portion. An aperture having a curved shape and extending into the fastener is positioned on a distal face of the fastener. The aperture may taper proximally into the fastener.

9 Claims, 2 Drawing Sheets

U.S. PATENT DOCUMENTS

| | | | |
|---|---|---|---|
| 5,108,238 A * | 4/1992 | Ewing | 411/5 |
| 5,221,170 A * | 6/1993 | Duffy et al. | 411/428 |
| 6,149,363 A | 11/2000 | March | |
| 6,302,630 B1 | 10/2001 | Grant | |
| 6,599,071 B1 * | 7/2003 | McCauley et al. | 411/378 |
| 6,632,057 B1 * | 10/2003 | Fauchet | 411/403 |
| RE38,664 E * | 11/2004 | Luhm | 411/43 |
| 7,025,550 B2 * | 4/2006 | Monserratt et al. | 411/361 |

FOREIGN PATENT DOCUMENTS

| | | |
|---|---|---|
| GB | 659432 | 10/1951 |
| GB | 1035566 | 7/1966 |
| GB | 2261483 | 5/1993 |
| GB | 2329947 | 4/1999 |

\* cited by examiner

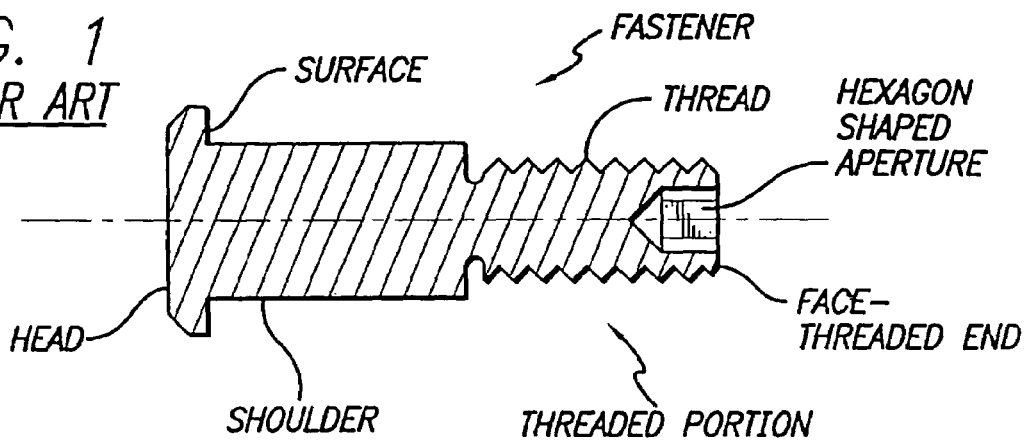
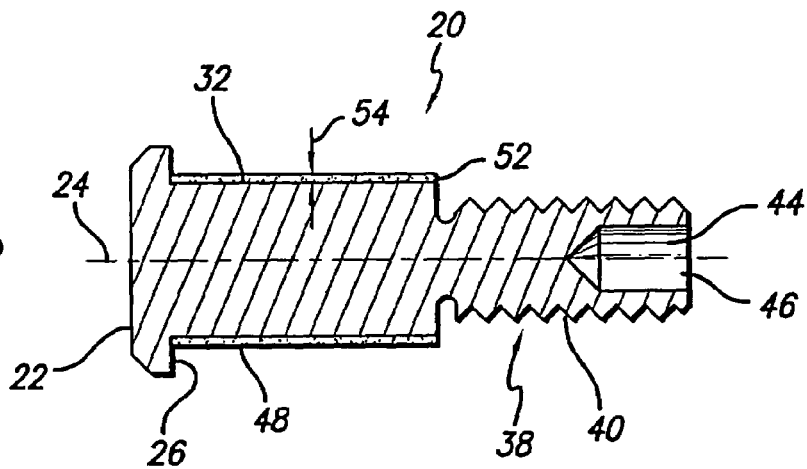
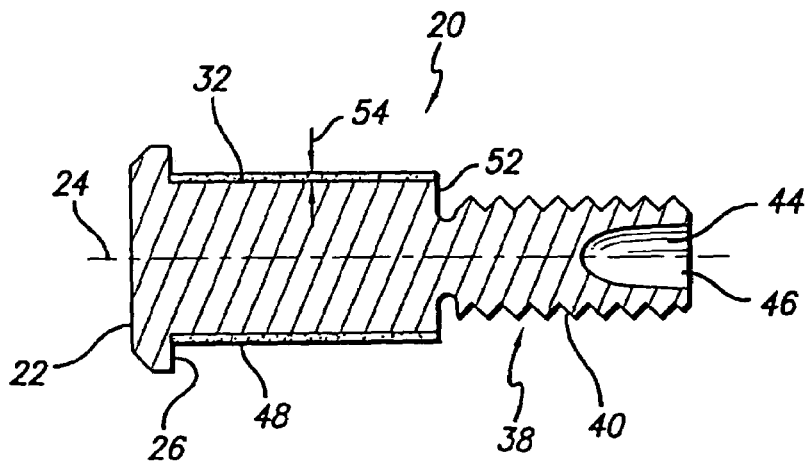

LIGHT WEIGHT FASTENER FOR USE ON INTERFERENCE FITS IN AUTOMATION

RELATED APPLICATIONS

This is a divisional of Ser. No. 10/154,483, filed May 23, 2002, now abandoned.

BACKGROUND OF THE INVENTION

1. Field of the Invention

This invention relates generally to fasteners, and more particularly to a fastener which is installed through automated installation and having a shoulder which provides an interference fit with a hole into which the fastener is being installed.

2. Description of the Related Art

Fasteners of the type to which this invention is directed ordinarily include a head at a proximal end, a shoulder distal to the head and a male threaded portion distal to the shoulder. The shoulder is typically sized to provide an interference fit with a hole that is located within a structure into which it is to be installed. The fastener also normally includes an aperture on a distal face of the fastener for receiving a torquing tool. Since the shoulder provides an interference fit, the threaded portion includes a diameter which is less than the diameter of the shoulder to avoid interference between the thread and the hole into which the fastener is to be installed.

At installation, the fastener is advanced distally through the hole until a distal surface on the head of the fastener contacts the structure and the shoulder is engaged with the hole. One method of advancing the fastener through the hole includes inserting the threaded portion of the fastener into the hole from one side of the structure and pushing the head distally toward the structure until the distal surface of the head contacts the structure. An alternative method includes inserting the threaded portion of the fastener into the hole from one side of the structure until the threaded portion is protruding through a surface on the opposite side of the structure. This step is followed by engaging the threads of the fastener with a tool and pulling the fastener distally through the hole until the distal surface of the head of the fastener contacts the structure. Having an interference fit, the fastener is retained within the hole in the structure by compressive forces from the hole being applied to the shoulder of the fastener. With the fastener thus retained, a female threaded device, such as a nut, is torqued onto the threaded portion of the fastener. The initial torquing of the female threaded device onto the fastener is performed lightly to prevent the fastener from spinning within the hole. To increase the level of torque between the female threaded device and the fastener, a driving tool, such as a hex-key or Allen wrench, is commonly inserted into a hexagon shape aperture at the distal face of the fastener and applies torsional force in a first direction, such as a counterclockwise direction, while a driving tool is engaged to the female threaded device to apply torsional force in a second direction, such as a clockwise direction.

Having a hexagon shape aperture at the distal face of the fastener requires that the hex-key be aligned with the aperture prior to insertion into the aperture. Oftentimes, a structure, such as an airframe, includes large quantities of fasteners of this configuration. Eliminating the step of aligning the hex-key on each such fastener in a structure can create time savings, and therefore cost savings, for structure assembly.

Another concern of manufacturers is the weight of a fully assembled structure including the fasteners. A large quantity of fasteners can add significantly to the total weight of the structure. For vehicle structures, such as an airframe, increased weight translates into increased operating costs due to increased fuel consumption and reduced payload. Although the hexagon shape aperture serves to reduce the weight of the fastener, there are structural limitations on the size of a hexagon shape aperture.

An additional concern is the cost of fabricating the hexagon shape aperture within the fastener. Fabricating the hexagon shape aperture commonly requires first adding a circular shape aperture to the fastener, such as by a drilling operation, followed by a broaching operation to transform the circular shape aperture to a hexagon shape aperture. The broaching operation includes forcing an elongated, serrated cutting tool having a hexagonal cross section into the circular shape aperture to enlarge and shape the circular shape into a hexagon shape. The broaching operation often requires an additional machine setup over the initial setup for adding the circular shape aperture. The additional machine setup and additional manufacturing step adds to the manufacturing costs of the fastener.

For the foregoing reasons, those skilled in the art have recognized the need for a fastener which allows manufacturers to save time and costs during the fabrication of the fasteners and the assembly of structures. Further, those skilled in the art have recognized the need to reduce the weight of fasteners. The present invention fulfils these needs and others.

SUMMARY OF THE INVENTION

Briefly, and in general terms, the present invention is directed to a fastener which can be installed into an interference fit hole in a structure through automated installation methods.

FIG. 1 is an illustration of a prior art fastener. Such a fastener ordinarily includes a head at a proximal end, a shoulder distal to the head and a threaded male portion distal to the shoulder. The fastener is sized to provide an interference fit with a hole in a structure in which the fastener is installed. The fastener normally includes an aperture to receive a torquing tool. The shoulder provides the interference fit; thus the threaded portion is of a smaller diameter than the shoulder. The present invention provides numerous important benefits compared to such prior art fasteners.

In a currently preferred embodiment of the invention, the fastener includes an enlarged protruding head which is positioned at a proximal end of the fastener and substantially centered about a longitudinal axis. The fastener also includes a substantially cylindrical shoulder portion which is positioned adjacent and distal to the head and substantially centered about the longitudinal axis. The shoulder portion includes a length having a first diameter. A surface of the shoulder portion includes a lubricant coating composition which facilitates installation of the shoulder portion into an interference fit hole. A threaded portion of the fastener is positioned adjacent and distal to the shoulder portion and is substantially centered about the longitudinal axis. The threaded portion includes a male thread and has a second diameter which is smaller than the first diameter of the shoulder portion. An aperture is positioned on a distal face of the fastener and is substantially centered about the longitudinal axis. The aperture has a substantially curved shape in a cross section that is substantially perpendicular to the longitudinal axis of the fastener and extends proximally into the fastener.

In one currently preferred aspect, the first diameter of the shoulder portion is configured to provide an interference fit with a hole in a structure into which it is to be installed. In another currently preferred aspect, the length of the shoulder portion is sufficient to protrude from a surface on a second side of the structure while a distal surface of the head is in contact with a surface on a first side of the structure. In a further currently preferred aspect, the length of the shoulder portion is sized so that the shoulder does not protrude from a surface on a second side of the structure while the distal surface of the head is in contact with a surface on a first side of the structure. In one currently preferred aspect, a distance across the periphery at the opening of the aperture is about fifty percent to about seventy-five percent of the diameter of the threaded portion. In a further currently preferred aspect of the embodiment, a depth of the aperture is about one to about two times the distance across the periphery at the opening of the aperture. In another currently preferred aspect, the curved shape of the aperture includes a substantially circular shape having a diameter. The diameter at the opening of the aperture is about fifty percent to about seventy-five percent of the diameter of the threaded portion. In a further currently preferred aspect, the aperture extends substantially longitudinally in a proximal direction into the fastener, while in another currently preferred aspect, the aperture tapers proximally into the fastener. In one currently preferred aspect, the taper includes a substantially conical shape, while in another currently preferred aspect the taper includes a substantially parabolic shape. In an additional currently preferred aspect, the lubricant coating composition on the shoulder portion includes polytetrafluoroethylene.

In a second currently preferred embodiment involving a method of using the invention, a fastener having an aperture which extends substantially longitudinally in a proximal direction into the fastener may be installed into an interference fit hole in a structure. The method for installing the fastener includes providing the fastener and a structure having an interference fit hole. The threaded portion of the fastener is inserted into the hole in the structure from a first side of the structure. The fastener is advanced distally through the hole until a distal surface on the head of the fastener contacts a surface on the first side of the structure. The fastener is retained within the hole through compressive forces from the hole being applied to the shoulder portion of the fastener. A female threaded device is provided and torqued onto the threaded portion of the fastener.

In one currently preferred detailed aspect, the step of advancing the fastener includes pushing the head of the fastener distally toward the structure until the distal surface on the head contacts the structure. In another currently preferred aspect, the step of advancing the fastener includes advancing the fastener distally until the threaded portion protrudes through a surface on a second side of the structure. This is followed by a step which includes engaging the threaded portion with a tool and applying a distal pulling force to the fastener through the use of the tool until the distal surface on the head contacts the structure.

In a third currently preferred embodiment of the invention, a fastener having an aperture which tapers proximally into the fastener may be installed into an interference fit hole in the structure. The method for installing the fastener includes providing the fastener and a structure having an interference fit hole. The threaded portion of the fastener is inserted into the hole in the structure from a first side of the structure. The fastener is advanced distally through the hole until a distal surface on the head of the fastener contacts a surface on the first side of the structure. The fastener is retained within the hole through compressive forces from the hole being applied to the shoulder portion of the fastener. A tapered pin is provided and inserted into the aperture in the fastener. Force is applied to the aperture in a proximal direction through the tapered pin. A female threaded device is provided and torqued onto the threaded portion of the fastener.

From the above, it may be seen that the invention provides for a fastener having reduced weight compared to similar prior art fastener systems for aircraft structures. It may also be seen that the fastener may be fabricated and installed with better economy in comparison to fasteners having a hexagon or other shape aperture positioned at the distal face. These and other aspects and advantages of the invention will become apparent from the following detailed description and the accompanying drawings, which illustrate by way of example the features of the invention.

BRIEF DESCRIPTION OF THE DRAWINGS

FIG. 1 is a cross-section view depicting an embodiment of a prior art fastener.

FIG. 2 is a cross-section view depicting an embodiment of the fastener of the present invention.

FIG. 3 is a cross-section view depicting an embodiment of the fastener of the present invention.

DETAILED DESCRIPTION OF THE PREFERRED EMBODIMENTS

Figure 4:
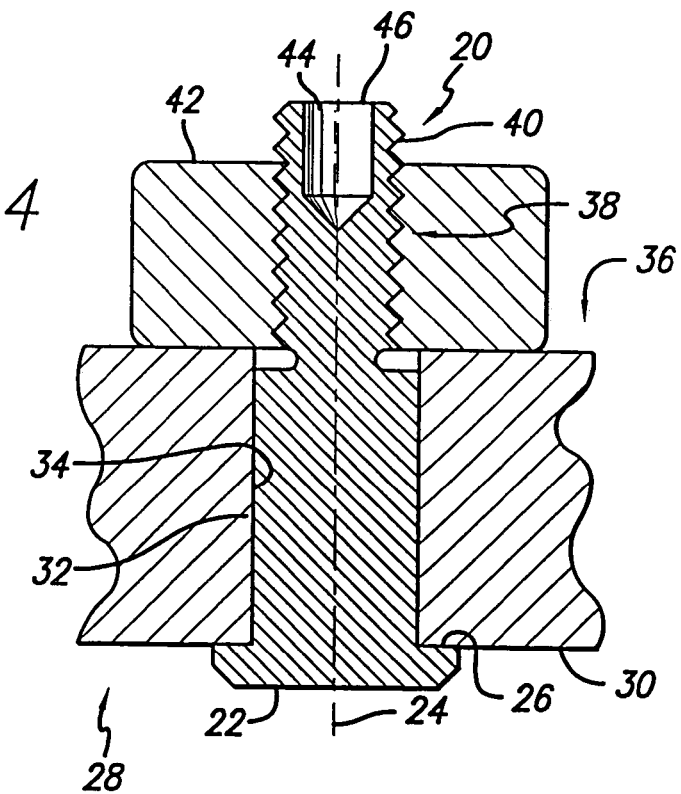
FIG. 4 is a cross-section view depicting the fastener of FIG. 2 installed within a structure.

As shown in the drawings for purposes of illustration, the invention is embodied in a fastener which is installed into a hole within a structure. Referring to the drawings in which like reference numerals are used to designate like or corresponding elements among the figures, FIG. 2 depicts a fastener 20 of the present invention. The fastener 20 includes an enlarged protruding head 22 which is positioned at a proximal end of the fastener and substantially centered about a longitudinal axis 24 of the fastener. The head 22 may include a distal surface 26 which is configured to contact a surface on a first side of a structure into which the fastener 20 is being installed. Although FIG. 2 depicts the fastener 20 having a pan head 22 configuration, the invention is not limited to such configurations and may include other head configurations.

Adjacent and distal the head 22 and substantially centered about the longitudinal axis 24 is a substantially cylindrical shoulder portion 32 having a first diameter. As used herein, the term "adjacent" can mean "near" or "close to," and is therefore not limited to "adjoining." The shoulder portion 32 is configured to be received into a hole 34 (FIGS. 4 and 5) within a structure 30 with the first diameter of the shoulder portion providing an interference fit with the hole. The length of the shoulder portion 32 may be configured to various sizes. In one embodiment, the length of the shoulder portion 32 is sufficient to protrude from a surface on a second side 36 of the structure 30 while the distal surface 26 on the head 22 is in contact with the surface on the first side 28 of the structure. However, in another currently preferred embodiment, the length of the shoulder portion 32 is sized so that the shoulder portion does not protrude from the surface on the second side 36 of the structure 30 while the distal surface on the head 22 is in contact with the surface on the first side 28 of the structure. The shoulder portion 32 may be formed by manufacturing methods that are well known in the art, such as by forging or machining.

Adjacent and distal to the shoulder portion 32 and substantially centered about the longitudinal axis 24 is a threaded portion 38 having a male thread 40 configuration for receiving a female threaded device 42 (FIGS. 4 and 5), such as a threaded nut. To facilitate installation of the fastener 20 into the interference fit hole 34 in the structure 30, the threaded portion 38 includes a second diameter which is smaller than the first diameter of the shoulder portion 32 such that there is a clearance fit between the threaded portion 38 and the hole within the structure. The threads 40 may be formed by manufacturing methods that are well known in the art, such as by machining on a lathe or by thread rolling. Thread rolling is a process in which the portion of the fastener which is to be threaded is placed between dies having thread-shaped ridges which sink into the fastener and displace the fastener material. The fastener is rolled between the dies to form the thread around the full circumference of the fastener.

An aperture 44, which is substantially centered about the longitudinal axis 24, is positioned on a distal face 46 of the fastener 20. The aperture 44 may include a substantially curved shape, such as a substantially circular shape, in a cross section which is substantially perpendicular to the longitudinal axis of the fastener. Further, the aperture 44 extends proximally into the fastener 20 to form a cavity. In one currently preferred embodiment (FIG. 2), the aperture 44 extends substantially longitudinally into the fastener 20. In another currently preferred embodiment (FIG. 3), the aperture 44 tapers into the fastener 20. The taper (FIG. 3) of the aperture 44 may include different forms, such as a substantially conical shape or a substantially parabolic shape. The distance across a periphery of the aperture 44 opening at the distal face 46 of the fastener 20 may include a wide range of sizes. In one embodiment, the distance across the periphery of the aperture 44 opening is about fifty percent to about seventy-five percent of the diameter of the threaded portion 38. However, this range is not limiting as the distance across the periphery of the aperture opening may be larger or smaller than this range. In another currently preferred embodiment, the distance across the periphery of the aperture 44 opening is substantially the same size as the distance between the corners of a hexagon shape aperture of a similar fastener (FIG. 1).

The depth of the aperture 44 or cavity may be substantially deeper than the depth of a hexagon shape aperture of a similar prior art fastener. In one currently preferred embodiment, the depth of the aperture 44 or cavity is about one to about two times the distance across the periphery of the aperture opening at the distal face 46. However, this range is not limiting as the depth of the aperture opening may be larger or smaller than this range. The periphery size and the depth of the aperture 44 cause the aperture in the fastener 20 of the present invention to have a greater volumetric area than the hexagon shape aperture of similar prior art fasteners. The aperture 44 may be formed by manufacturing methods that are well known in the art, such as by machining, forging or electric-discharge machining (EDM).

Figure 5:
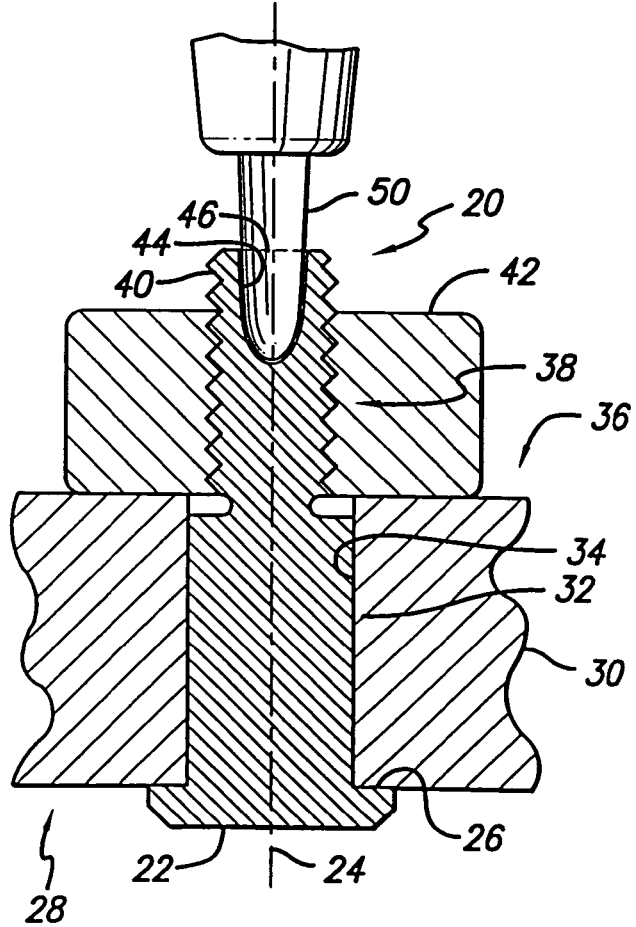
FIG. 5 is a cross-section view depicting the fastener of FIG. 3 installed within a structure.

Referring to FIGS. 4 and 5, the fastener 20 may be installed into a structure through automated installation methods. During installation of the fastener 20 into the structure 30, the threaded portion 38 of the fastener is inserted into the hole 34 within the structure from the first side 28 of the structure. The fastener 20 is advanced distally through the hole 34 until the distal surface 26 on the head 22 contacts the surface on the first side 28 of the structure. Since the first diameter of the shoulder portion 32 of the fastener is sized to create an interference fit with the hole 34 in the structure, extra force must be applied to advance the shoulder portion distally through the hole. The extra force may be applied by pushing the head 22 distally toward the structure 30 until the distal surface 26 on the head contacts the surface on the first side 28 of the structure. Alternatively, after the threaded portion 38 protrudes through the surface on the second side 36 of the structure, the threaded portion may be engaged with a tool. Through the use of the tool, a pulling force may be applied to the fastener 20 to distally advance the fastener through the hole 34 until the distal surface 26 on the head 22 contacts the surface on the first side 28 of the structure. With the shoulder portion 32 of the fastener 20 having an interference fit with the hole 34 in the structure 30, the fastener is retained within the hole by compressive forces from the hole being applied to the shoulder portion of the fastener. As will be discussed below in more detail, the shoulder portion 32 of the fastener 20 may be coated with a composition 48 which includes a lubricant to facilitate wear resistance between the fastener and the hole 34 during installation of the fastener.

With the fastener 20 installed in the hole 34 within the structure 30, the distal surface 26 on the head 22 of the fastener contacting the surface on the first side 28 of the structure, and the compressive force from the hole being applied to the shoulder portion 32 of the fastener, a female threaded device 42, such as a threaded nut, may be torqued onto the threaded portion 38 of the fastener through the use of the tool. In one embodiment, the compressive force from the hole 34 onto the shoulder portion 32 of the fastener 20 is sufficient to prevent the fastener from spinning while the female threaded device 42 is being torqued onto the threaded portion 38 of the fastener. However, in another embodiment, a tapered pin 50 (FIG. 5) may be inserted into the aperture 44 in the fastener 20. Force may be applied to the aperture 44 in a proximal direction via the tapered pin 50 during the torquing of the female threaded device 42 to prevent spinning of the fastener 20. Applying force to the aperture with the tapered pin 50 may prevent spinning of the fastener 20 through friction between the tapered pin and the aperture 44.

Referring again to the lubricant coating composition 48, adhesion of the coating composition on the shoulder portion 32 of the fastener 20 is essential in order for the fastener to withstand installation into the hole 34 in the structure 30 without experiencing appreciable damage to the fastener or structure. The coating composition 48 may provide a film of which at least a base part is sufficiently adherent that it cannot be mechanically removed except along with some of the underlying metal of the shoulder portion 32. It thereby provides a reliably slick surface with a coefficient of friction sufficiently low to enable the fastener 20 to be installed into the hole 34 in the structure 30 with significantly lower forces than a fastener without the lubricant coating composition 48.

For purposes of illustration, FIGS. 2 and 3 depict the fastener 20 with its shoulder portion 32 surrounded by a layer 52 of the coating composition 48. The layer 52 of the coating composition 48 may have a dimension of thickness 54 established in part by the viscosity of the liquid mixture when it is being applied. In one embodiment, the thickness 54 may be approximately 0.008 to 0.010 mm (0.0003 to 0.0004 inches). The coating composition 48 may include a cured mixture of a thermosetting resin, fillers and a solvent. An exemplary coating composition for the purposes of this invention is the well-known Hi-Kote 4 coating sold by Hi-Shear Corporation of Torrance, Calif.

The resin may be a thermosetting type of resin which, when cured, adheres to the metal substrate of the fastener 20 and forms a tough outer cladding for the substrate. In one embodiment, the resin resists wrinkling and delamination from the metal substrate. The resin may also be tolerant of additives that may be incorporated into the composition to obtain different characteristics for the film-forming composition. Further, the resin may be temperature resistant, thereby resisting stresses caused by thermal cycling. Additionally, the resin may be resistant to many solvents. Although resins with these characteristics provide a suitable coating that is useful for many purposes, fillers must be added to the resin to accomplish the objectives of this invention.

To reduce the coefficient of friction of the cured coating, quantities of polytetrafluoroethylene, known commercially as Teflon™, and an olefin may be incorporated into the coating composition 48 prior to curing. The olefin may be based on either polyethylene or polypropylene. Various percentages by weight of Teflon can be utilized in the coating composition 48 to attain different degrees of the coefficient of friction. In addition to fillers for reducing the coefficient of friction, other fillers may be added, such as for increasing corrosion resistance or for adding color to the cured coating.

The resin and fillers are incorporated into a carrier, such as a solvent. The solvent may be volatile and must be able to dissolve the uncured resin. The resin may be partially reacted to form a solvent soluble oligomer into which the fillers are stirred and milled to form a paste. The paste may then be dissolved into the solvent. Suitable solvents include aromatic hydrocarbons, such as xylene or toluene; alcohol, such as methyl, ethyl, propyl alcohol ketone or methyl isobutyl ketone; or other suitable solvents or combinations thereof. After the resin and fillers are mixed into or dissolved into the solvents, the resulting coating composition may be applied onto the metal substrate of the parts. The coating composition 48 may be applied to the shoulder portion 32 through methods that are well known in the art, such as by spraying or dipping.

By using fasteners 20 of the current invention, manufacturers can save fabrication costs over similar prior art fasteners having a hexagon shape aperture at the distal face. For instance, the cost of fabricating the circular aperture 44 in the fastener 20 of the present invention is less than the cost of fabricating a hexagon shape aperture because the circular aperture requires fewer steps to fabricate. More particularly, the circular aperture 44 in the fastener 20 of the present invention can be fabricated through a single machine operation and setup. The hexagon shape aperture, however, typically requires at least two machine setups and at least two machine operations. By eliminating machine setups and machine operations, the overall cost of the fastener 20 is reduced.

The fastener 20 of the present invention also allows manufactures to reduce operating costs over the use of fasteners having a hexagon shape aperture at the distal face. The fasteners having a hexagon shape aperture at the distal face require the use of a driving tool, such as a hex-key, during installation. A hex-key must be radially aligned prior to insertion into the hexagon shape aperture. Alignment of the hex-key leads to increased operating costs for use of the fasteners having the hexagon shape aperture at the distal face. Rather than having a hexagon shape aperture at the distal face, the fastener 20 of the present invention includes a substantially curved shape aperture 44 which does not require the use of a tool that must be aligned with the aperture. Further, when the fastener includes a tapered aperture, a tool, such as a tapered pin 50, may be inserted into and apply force to the aperture 44 in a proximal direction to prevent spinning of the fastener 20 while torquing a female threaded device onto the fastener. Since it has no corners or edges such as those found on the hex-key, the tapered pin does not require radial alignment prior to insertion into the tapered aperture. By eliminating the need to radially align a tool, the fastener 20 of the present invention reduces the operating costs for manufacturers over the use of fasteners having a hexagon shape aperture at the distal face of the fastener.

The fastener 20 of the present invention also allows manufacturers to reduce the weight for structures 30 including the fasteners in comparison to structures which include fasteners having a hexagon shape aperture at the distal face of the fastener. Since the volumetric area of the aperture 44 in the fastener 20 of the present invention is larger than the volumetric area of the hexagon shape aperture for a similar fastener, the fastener of the present invention weighs less than the similar prior art fastener (FIG. 1). With the use of a large quantity of fasteners within a structure 30, the reduced weight per fastener 20 can lead to a significant weight savings for the structure. The weight savings for a structure such as an airframe can result in reduced fuel consumption and increased payload capacity.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed:

1. In combination, an apparatus for installing a fastener into a hole within a structure, comprising:
    a fastener including an enlarged protruding head positioned at a proximal end of the fastener and substantially centered about a longitudinal axis of the fastener;
    a substantially cylindrical shoulder portion positioned adjacent to and extending distally from the head and substantially centered about the longitudinal axis, the shoulder portion having a first diameter;
    a lubricant coating composition on a surface of the shoulder portion;
    a threaded portion positioned adjacent to and extending distally from the shoulder portion and substantially centered about the longitudinal axis, the threaded portion including a male thread for receiving a female threaded device and having a second diameter smaller than the first diameter of the shoulder portion;
    an aperture positioned on a distal face of the fastener and substantially centered about the longitudinal axis, the aperture substantially defining a parabaloid and extending proximally into the fastener such that a diameter of the aperture decreases in a proximal direction; and
    a tapered pin having a substantially parabolic shape having a circular cross section corresponding to the shape of the aperture adapted to be inserted in said aperture with a force to prevent spinning of the fastener when said female threaded device is received on said threaded portion.

2. The apparatus of claim 1, wherein the first diameter of the shoulder portion is configured to provide an interference fit with a hole in a structure into which it is to be installed.

3. The apparatus of claim 1, wherein the length of the shoulder portion is sized so that the shoulder portion does not protrude from a surface on a second side of the structure while a distal surface of the head is in contact with a surface on a first side of the structure.

4. The apparatus of claim 1, wherein a distance across the periphery at the opening of the aperture is about fifty percent to about seventy-five percent of the diameter of the threaded portion.

5. The apparatus of claim 1, wherein a depth of the aperture is about one to about two times the distance across the periphery at the opening of the aperture.

6. The apparatus of claim 1, wherein the lubricant coating composition comprises polytetrafluoroethylene.

7. A method for installing a fastener into a hole in a structure, comprising:
   providing a fastener having,
      an enlarged protruding head positioned at a proximal end of the fastener and substantially centered about a longitudinal axis,
      a substantially cylindrical shoulder portion positioned adjacent to and extending distally from the head and substantially centered about the longitudinal axis, the shoulder portion having a first diameter and being configured to provide an interference fit with the hole in the structure,
      a lubricant coating composition on a surface of the shoulder portion, the lubricant coating composition including polytetrafluoroethylene,
      a threaded portion positioned adjacent to and extending distally from the shoulder portion and substantially centered about the longitudinal axis, the threaded portion including a male thread and having a second diameter smaller than the first diameter of the shoulder portion, and
      an aperture positioned on a distal face of the fastener and substantially centered about the longitudinal axis, the aperture extending proximally into the fastener to form a cavity having a substantially parabolic shape, said cavity substantially defining a parabaloid and tapering into the fastener, a distance across a periphery at the opening of the aperture being about fifty percent to about seventy-five percent of the diameter of the threaded portion, the depth of the cavity being about one to about two times the distance across the periphery at the opening of the aperture;
   providing a structure having a hole therethrough;
   inserting the threaded portion of the fastener into the hole in the structure from a first side of the structure;
   advancing the fastener distally through the hole until a distal surface on the head of the fastener contacts a surface on the first side of the structure;
   retaining the fastener within the hole through compressive forces from the hole being applied to the shoulder portion of the fastener;
   providing a tapered pin having a substantially parabolic shape having a circular cross section corresponding to the shape of the aperture;
   inserting the tapered pin into the aperture;
   causing the tapered pin to frictionally engage the aperture, preventing spinning of the fastener by applying force in a proximal direction to the aperture via the tapered pin;
   providing a female threaded device; and
   torquing the female threaded device onto the threaded portion of the fastener.

8. The method of claim 7, wherein advancing the fastener comprises pushing the head of the fastener distally toward the structure until the distal surface on the head contacts the surface on the first side of the structure.

9. The method of claim 7, wherein advancing the fastener comprises:
   advancing the fastener distally until the threaded portion protrudes through a surface on a second side of the structure;
   engaging the threaded portion with a tool; and
   applying a distally directed pulling force to the fastener through the use of the tool until the distal surface on the head contacts the surface on the first side of the structure.

* * * * *

UNITED STATES PATENT AND TRADEMARK OFFICE
CERTIFICATE OF CORRECTION

PATENT NO. : 7,275,903 B2  Page 1 of 1
APPLICATION NO. : 10/898645
DATED : October 2, 2007
INVENTOR(S) : Dennis Schultz It is certified that error appears in the above-identified patent and that said Letters Patent is hereby corrected as shown below:

Column 9, Lines 42-43,
delete "having a substantially parabolic shape"

Signed and Sealed this

Twenty-sixth Day of January, 2010

David J. Kappos
*Director of the United States Patent and Trademark Office*